Patented July 7, 1931

1,813,574

UNITED STATES PATENT OFFICE

WILLIAM HORLICK, JR., OF RACINE, WISCONSIN

FOOD PRODUCT AND METHOD OF MANUFACTURE THEREOF

No Drawing.   Application filed January 27, 1928.   Serial No. 250,095.

The invention relates to the manufacture of food compounds from milk and converted starch or hydrolized cereal products and seeks to provide an improved palatable food in powder form and soluble in milk or water, and in which the contained protein matter is digested or partially so in order that it may be more readily assimilated by children and invalids.

In accordance with the present invention a wort is prepared by mashing a cereal or cereal flour and malt to effect the conversion of the contained starch to sugar and to the resultant infusion or liquid extract, milk and fresh pineapple juice are added. Then after a period of digestion in which the proteolytic ferment, bromelin, contained in the pineapple, converts the contained albuminous or protein matter into more readily assimilable form, the mixture is evaporated and the dried product preferably ground to powder form.

The wort is preferably prepared from equal parts by weight of wheat flour and barley malt or malt flour and four or five times as much water. The mash is then heated and its temperature gradually raised to about 150 or 155° F. and is maintained at this temperature for a period of approximately fifteen minutes, and thereafter the temperature is gradually raised to about 170 or 175° F. By this treatment the contained starch is converted into maltose and dextrine and some of the insoluble albuminoids are converted into soluble form.

The wort or liquid extract obtained from the mash is drawn off and mixed with milk and pineapple. Preferably fresh milk and ripe pineapple cut up into small pieces, are employed, and about two pounds of fresh milk and about one pound of the fresh cut up pineapple are employed for each pound of malt and wheat flour used in forming the wort. The mixture is then stirred and digested for a period of ninety minutes to three hours and the temperature of the mixture is maintained at about 120 to 130° F. During this period, the enzymes present and particularly the bromelin contained in the pineapple, convert the proteids of the milk and cereal ingredients into more soluble and more readily digestible forms, chiefly peptones, amides, and the like. The mixture is then evaporated and the dried product ground to a fine powder.

The improved food product is very palatable and is very easily digested and it may be readily mixed and dissolved in water or milk to form a satisfactory beverage of high food value. Also, the improved product contains bromelin in excess and hence it will aid in the digestion of other protein matter that may be consumed with it.

If desired, the milk employed may be homogenized before it is added to the other ingredients to break up the fat globules so that they are more readily acted upon by the enzymes in the digestion. Also, while fresh milk is preferred, concentrated or condensed milk may be employed. Instead of cut up pineapple, fresh pineapple juice may be used in the proportion of about one-quarter of a pint of juice for each two pounds of fresh milk.

As an aid in effecting the digestion of the contained proteids, other proteolytic ferments or enzymes, such as pepsin or pancreatin may be employed, but as pepsin under favorable conditions will digest about three thousand times its weight of protein matter, and as pancreatin will convert about twenty-five times its weight of casein into proteoses or partially digested protein only comparatively small quantities of such ingredients need be used.

I am aware that a part of the palatableness of the product is due to the fruity nature of the pineapple and wish to include the use of other fruits and fruit juices such as peaches, strawberries, raspberries and the like with or without the pineapple. As these fruits do not contain bromelin or a similar enzyme I use with them other proteolytic enzymes such as pepsin and pancreatin. Since the activity of pancreatin is injured or destroyed by the presence of a marked excess of acid, when I use that ferment I first digest the fresh milk or the milk and liquid extract of cereal with the pancreatin before adding the fruit or fruit juice. The temperature of digestion may be approximately 104° F. to 120° F. Four to eight ounces of the dry pancreatin to one hundred gallons of the fresh milk may be used and the time of digestion, from 160 to 180 minutes. Within limits these factors may be varied without changing the general nature of the product.

When pepsin is used the various materials, cereal extract, milk and crushed fruit or fruit juice are best digested together and the amount of pepsin may be approximately one-eighth ounce for each one hundred gallons of milk used, the temperature being substantially as indicated for the pancreatin.

In case pancreatin or pepsin is used in addition to pineapple, the amounts stated would be preferably reduced by about one-half. Preferably, in order that the product may be quite palatable, the time of digestion is such that the contained protein is not entirely converted.

Other changes may be made in the details set forth without departure from the scope of the invention as defined in the appended claims.

I claim:

1. The process of manufacturing a food compound which comprises forming a cereal wort, adding milk and a fruit material containing a proteolytic ferment or ferments, effecting a partial digestion of the proteins of the milk and cereal and then, without destroying the digestive power of the ferment or ferments, reducing the same to highly concentrated form, substantially as described.

2. The process of forming a food compound which comprises mashing malt and a cereal flour to form a liquid extract containing maltose and dextrine, adding milk and a fruit material containing bromelin, effecting a partial digestion of the cereal and milk proteins by aid of the bromelin and then, without destroying the digestive power of the bromelin, reducing the mixture to dry, powdered form, substantially as described.

3. The method of manufacturing a food product comprising forming a cereal extract, adding milk and pineapple and effecting a partial digestion of the milk and cereal proteins by aid of the ferment or ferments contained in the pineapple, substantially as described.

4. The process of manufacturing an improved soluble food compound which consists in forming an extract of substantially equal parts of wheat flour and barley malt, converting the contained starch into sugar, then adding one part by weight of fresh milk and one-half part by weight of fresh fruits containing digestive ferments, effecting a partial digestion of the milk and cereal proteins by aid of the ferments and then, without destroying the digestive power of the ferments, reducing the same to dry, powdered form, substantially as described.

5. A powdered, soluble food compound formed of cereal product, milk and fruit material, and in which the proteins of the milk and cereal are partially digested by aid of a proteolytic ferment or ferments originally present in the fruit, substantially as described.

6. An improved, soluble food compound formed of converted cereal products, milk and fruit material, and containing milk and cereal proteids, partially digested by the aid of the bromelin content in the fruit material substantially as described.

7. An improved food product comprising cereal wort, milk and pineapple, and in which the proteins of the milk and cereal are partially digested by aid of the ferments contained in the pineapple, substantially as described.

W. HORLICK, JR.